US011711709B2

(12) United States Patent
Vagelos

(10) Patent No.: US 11,711,709 B2
(45) Date of Patent: Jul. 25, 2023

(54) SYSTEM AND PROCESS FOR USING CELLULAR CONNECTIVITY ANALYSIS TO DETERMINE OPTIMAL WIRELESS EQUIPMENT AND SERVICE FOR A GEOGRAPHICAL AREA

(71) Applicant: TracFone Wireless, Inc., Miami, FL (US)

(72) Inventor: Theodore Vagelos, Miami, FL (US)

(73) Assignee: Tracfone Wireless, Inc., Miami, FL (US)

( * ) Notice: Subject to any disclaimer, the term of this patent is extended or adjusted under 35 U.S.C. 154(b) by 0 days.

(21) Appl. No.: 17/073,771

(22) Filed: Oct. 19, 2020

(65) Prior Publication Data

US 2021/0037408 A1 Feb. 4, 2021

Related U.S. Application Data

(63) Continuation-in-part of application No. 16/548,264, filed on Aug. 22, 2019.

(60) Provisional application No. 62/721,871, filed on Aug. 23, 2018.

(51) Int. Cl.
| | |
|---|---|
| H04W 4/00 | (2018.01) |
| H04W 24/10 | (2009.01) |
| H04W 8/12 | (2009.01) |
| H04B 17/336 | (2015.01) |
| H04W 36/00 | (2009.01) |
| H04B 17/318 | (2015.01) |
| H04W 8/04 | (2009.01) |

(52) U.S. Cl.
CPC .......... *H04W 24/10* (2013.01); *H04B 17/318* (2015.01); *H04B 17/336* (2015.01); *H04W 8/04* (2013.01); *H04W 8/12* (2013.01); *H04W 36/00837* (2018.08)

(58) Field of Classification Search
CPC .................................................... H04W 24/10
See application file for complete search history.

(56) References Cited

U.S. PATENT DOCUMENTS

| | | |
|---|---|---|
| 6,832,085 B1 | 12/2004 | McDonagh et al. |
| 7,043,254 B2 | 5/2006 | Chawla et al. |
| 7,218,928 B2 | 5/2007 | Park et al. |
| 7,596,373 B2 | 9/2009 | McGregor et al. |
| 7,764,959 B2 | 7/2010 | Jaquet |

(Continued)

*Primary Examiner* — Guang W Li

(57) ABSTRACT

A system configured to analyze cellular connectivity information for at least one wireless network and at least one wireless device includes a processor configured to receive cellular connectivity information from at least one wireless network for at least one wireless device; the processor further configured to receive geographic location information from the at least one wireless network for the at least one wireless device. The system also includes a database configured to store the cellular connectivity information, the geographic location information, and equipment type information related to the at least one wireless device. The processor further configured to analyze the cellular connectivity information and determine a wireless device having poor wireless service performance based on the analysis of the cellular connectivity information. The disclosure additionally includes a process to analyze cellular connectivity information for at least one wireless network and at least one wireless device.

18 Claims, 6 Drawing Sheets

(56) References Cited

U.S. PATENT DOCUMENTS

| | | | |
|---|---|---|---|
| 7,768,968 | B2 | 8/2010 | Plehn et al. |
| 7,848,782 | B2 | 12/2010 | Stern-Berkowitz et al. |
| 7,865,194 | B2 | 1/2011 | Roskowski |
| 7,933,557 | B1 | 4/2011 | Townley et al. |
| 7,983,668 | B2 | 7/2011 | Tiernan |
| 8,014,345 | B2 | 9/2011 | Simms et al. |
| 8,045,948 | B2 | 10/2011 | Izumi et al. |
| 8,050,671 | B2 | 11/2011 | Calin et al. |
| 8,064,391 | B2 | 11/2011 | Kozisek et al. |
| 8,099,098 | B2 | 1/2012 | Borst et al. |
| 8,103,280 | B2 | 1/2012 | Austin et al. |
| 8,145,186 | B1 | 3/2012 | Vaughan |
| 8,190,145 | B2 | 5/2012 | Csapo et al. |
| 8,195,099 | B2 | 6/2012 | Bhattad et al. |
| 8,254,909 | B1 | 8/2012 | Wright et al. |
| 8,295,231 | B2 | 10/2012 | Stolyar et al. |
| 8,406,784 | B2 | 3/2013 | Bodine et al. |
| 8,412,189 | B2 | 4/2013 | Plestid |
| 8,423,014 | B2 | 4/2013 | McGregor et al. |
| 8,488,660 | B2 | 7/2013 | Joung et al. |
| 8,520,603 | B2 | 8/2013 | Kozisek et al. |
| 8,578,020 | B2 | 11/2013 | Van Den Bogaert et al. |
| 8,583,136 | B2 | 11/2013 | Sawamoto |
| 8,599,744 | B2 | 12/2013 | Lee et al. |
| 8,625,459 | B2 | 1/2014 | Puthenpura et al. |
| 8,630,194 | B2 | 1/2014 | Tompson et al. |
| 8,644,191 | B2 | 2/2014 | Puthenpura et al. |
| 8,645,251 | B2 | 2/2014 | Egner et al. |
| 8,676,248 | B2 | 3/2014 | Weinrib et al. |
| 8,687,482 | B2 | 4/2014 | Ergen et al. |
| 8,712,402 | B2 | 4/2014 | Kumar et al. |
| 8,787,836 | B1 | 7/2014 | Carbajal |
| 8,798,548 | B1 | 8/2014 | Carbajal |
| 8,805,291 | B1 | 8/2014 | Garcia et al. |
| 8,805,292 | B1 | 8/2014 | Carbajal |
| 8,825,042 | B2 | 9/2014 | McCarthy et al. |
| 8,825,062 | B2 | 9/2014 | Zasowski et al. |
| 8,830,862 | B2 | 9/2014 | Agarwal et al. |
| 8,838,122 | B2 | 9/2014 | Stamoulis et al. |
| 8,848,549 | B2 | 9/2014 | Cui et al. |
| 8,861,395 | B2 | 10/2014 | Tompson et al. |
| 8,868,005 | B1 | 10/2014 | Carbajal |
| 8,874,044 | B1 | 10/2014 | Carbajal |
| 8,880,111 | B2 | 11/2014 | Stamoulis et al. |
| 8,885,696 | B1 | 11/2014 | Garcia et al. |
| 8,897,767 | B2 | 11/2014 | Kojima |
| 8,995,929 | B2 | 3/2015 | Chen et al. |
| 9,008,587 | B2 | 4/2015 | Carbajal |
| 9,019,820 | B1 | 4/2015 | Marupaduga et al. |
| 9,059,802 | B2 | 6/2015 | Tipton et al. |
| 9,075,716 | B2 | 7/2015 | Dempski et al. |
| 9,088,859 | B2 | 7/2015 | Egner et al. |
| 9,088,900 | B2 | 7/2015 | Epifani et al. |
| 9,119,092 | B1 | 8/2015 | Sarkar et al. |
| 9,143,947 | B2 | 9/2015 | Bodog |
| 9,179,348 | B2 | 11/2015 | Ostrup et al. |
| 9,191,848 | B2 | 11/2015 | Carbajal |
| 9,210,587 | B2 | 12/2015 | Sankaranarayanan |
| 9,253,673 | B2 | 2/2016 | Carbajal |
| 9,301,184 | B2 | 3/2016 | Bontu et al. |
| 9,313,603 | B2 | 4/2016 | Egner et al. |
| 9,332,458 | B2 * | 5/2016 | Nuss ............... H04W 28/0247 |
| 9,374,720 | B2 | 6/2016 | Wegmann et al. |
| 9,374,826 | B2 | 6/2016 | Kaichis et al. |
| 9,414,237 | B2 | 8/2016 | Garcia et al. |
| 9,420,473 | B2 | 8/2016 | Garcia et al. |
| 9,432,901 | B1 * | 8/2016 | Kwan ................ H04W 24/02 |
| 9,432,924 | B1 * | 8/2016 | Singh ................ H04W 48/18 |
| 9,456,362 | B2 | 9/2016 | Flanagan et al. |
| 9,479,943 | B1 | 10/2016 | Ofir et al. |
| 9,479,945 | B2 | 10/2016 | Shivashankar et al. |
| 9,537,586 | B2 | 1/2017 | Carbajal |
| 9,538,401 | B1 | 1/2017 | Ouyang et al. |
| 9,538,413 | B2 | 1/2017 | Chou et al. |
| 9,544,786 | B2 | 1/2017 | Collart |
| 9,544,841 | B2 | 1/2017 | Cui et al. |
| 9,554,289 | B2 | 1/2017 | Zhang et al. |
| 9,560,529 | B2 | 1/2017 | Blaunshtein et al. |
| 9,565,577 | B2 | 2/2017 | Kapnadak et al. |
| 9,585,030 | B2 * | 2/2017 | Lau ..................... G06F 3/0484 |
| 9,596,609 | B2 | 3/2017 | Chaudhuri et al. |
| 9,603,033 | B2 | 3/2017 | Garg et al. |
| 9,622,091 | B2 | 4/2017 | Garg et al. |
| 9,622,138 | B2 | 4/2017 | Bontu et al. |
| 9,635,573 | B2 | 4/2017 | Carbajal |
| 9,642,137 | B2 | 5/2017 | Wright et al. |
| 9,699,614 | B2 | 7/2017 | Kim et al. |
| 9,716,559 | B2 | 7/2017 | Chou |
| 9,749,069 | B2 | 8/2017 | Garcia et al. |
| 9,749,263 | B2 | 8/2017 | Jin et al. |
| 9,763,249 | B2 | 9/2017 | Lee et al. |
| 9,775,068 | B2 | 9/2017 | Fehske et al. |
| 9,775,164 | B2 | 9/2017 | Amini et al. |
| 9,780,823 | B2 | 10/2017 | Egner et al. |
| 9,781,607 | B2 | 10/2017 | Rath et al. |
| 9,788,220 | B2 | 10/2017 | Kalkunte et al. |
| 9,794,809 | B2 | 10/2017 | Chou et al. |
| 9,794,846 | B2 | 10/2017 | Sankaranarayanan |
| 9,794,850 | B2 | 10/2017 | Bontu et al. |
| 9,807,560 | B2 | 10/2017 | Rehnberg et al. |
| 9,807,613 | B2 | 10/2017 | Egner et al. |
| 9,826,334 | B2 | 11/2017 | Egner et al. |
| 9,832,082 | B2 | 11/2017 | Dade et al. |
| 9,838,888 | B2 | 12/2017 | Lihosit et al. |
| 9,848,337 | B2 | 12/2017 | Puthenpura et al. |
| 9,860,757 | B2 | 1/2018 | Udeshi et al. |
| 9,883,446 | B2 | 1/2018 | Gupta et al. |
| 9,900,790 | B1 | 2/2018 | Sheen et al. |
| 9,924,367 | B2 | 3/2018 | Kapnadak et al. |
| 9,942,115 | B2 | 4/2018 | Rizzi et al. |
| 9,942,779 | B1 | 4/2018 | Proctor et al. |
| 9,949,149 | B2 | 4/2018 | Garg et al. |
| 9,967,753 | B1 | 5/2018 | Jadunandan et al. |
| 9,967,793 | B2 | 5/2018 | Fravostino et al. |
| 9,980,216 | B2 | 5/2018 | Yu et al. |
| 9,992,723 | B2 | 6/2018 | Katar et al. |
| 9,998,243 | B2 | 6/2018 | Garcia et al. |
| 10,034,136 | B2 | 7/2018 | Egner et al. |
| 10,034,189 | B2 | 7/2018 | Futaki et al. |
| 10,034,263 | B2 | 7/2018 | Sharma et al. |
| 10,039,016 | B1 | 7/2018 | Larish et al. |
| 10,111,148 | B2 * | 10/2018 | Koskinen ........... H04W 36/0072 |
| 10,291,498 | B1 * | 5/2019 | Gailloux ............. H04L 64/003 |
| 10,299,173 | B2 * | 5/2019 | Wu ....................... H04W 88/10 |
| 10,327,193 | B2 * | 6/2019 | Shaw .................... H04W 36/36 |
| 10,397,840 | B2 * | 8/2019 | Shaw .................... H04W 36/08 |
| 10,440,639 | B1 | 10/2019 | Vivanco .......... H04W 36/00835 |
| 10,454,597 | B1 * | 10/2019 | Indurkhya .......... H04W 64/003 |
| 10,477,503 | B2 * | 11/2019 | Kalapatapu ....... H04W 28/0236 |
| 10,764,813 | B2 * | 9/2020 | Stauffer ............. H04W 36/0022 |
| 10,834,665 | B2 * | 11/2020 | Sun ....................... H04W 48/16 |
| 11,051,211 | B2 * | 6/2021 | Sharma ................ H04W 88/06 |
| 11,089,490 | B1 * | 8/2021 | Ta ....................... H04W 24/02 |
| 2002/0103010 | A1 | 8/2002 | Thomas et al. |
| 2008/0014964 | A1 | 1/2008 | Sudit et al. |
| 2009/0138593 | A1 * | 5/2009 | Kalavade ............. H04W 4/029 709/224 |
| 2012/0039175 | A1 | 2/2012 | Sridhar et al. |
| 2013/0223235 | A1 | 8/2013 | Hu et al. |
| 2013/0279354 | A1 * | 10/2013 | Ekman ................ H04L 41/5009 370/252 |
| 2014/0269364 | A1 | 9/2014 | Knapp et al. |
| 2014/0328190 | A1 * | 11/2014 | Lord ..................... H04W 24/08 370/252 |
| 2015/0073845 | A1 | 3/2015 | Bassir |
| 2015/0087321 | A1 | 3/2015 | Scherzer |
| 2015/0105094 | A1 | 4/2015 | Kotecha et al. |
| 2015/0215790 | A1 * | 7/2015 | Davari ................. H04W 24/02 455/446 |
| 2015/0358834 | A1 * | 12/2015 | Cronin ................. H04W 24/02 455/452.1 |
| 2015/0373574 | A1 | 12/2015 | Gordon et al. |
| 2016/0080955 | A1 | 3/2016 | Carbajal |
| 2016/0105819 | A1 | 4/2016 | Andrianov et al. |

(56) References Cited

U.S. PATENT DOCUMENTS

| | | | |
|---|---|---|---|
| 2016/0119806 A1 | 4/2016 | Carbajal | |
| 2016/0142931 A1 | 5/2016 | Mondal et al. | |
| 2016/0157126 A1 | 6/2016 | Nuss et al. | |
| 2016/0157147 A1* | 6/2016 | Saghir | H04W 36/04 455/444 |
| 2016/0162783 A1 | 6/2016 | Tan et al. | |
| 2016/0165462 A1 | 6/2016 | Fan et al. | |
| 2016/0205697 A1 | 7/2016 | Fan et al. | |
| 2016/0234749 A1* | 8/2016 | Singh | H04W 36/0022 |
| 2016/0234751 A1 | 8/2016 | Golaup et al. | |
| 2016/0249223 A1 | 8/2016 | Egner et al. | |
| 2016/0286114 A1* | 9/2016 | Fan | G02B 7/285 |
| 2016/0286425 A1 | 9/2016 | Gormley et al. | |
| 2016/0301486 A1* | 10/2016 | Joey | H04B 17/318 |
| 2016/0323705 A1 | 11/2016 | Murphy et al. | |
| 2016/0323920 A1 | 11/2016 | Carbajal | |
| 2016/0373941 A1 | 12/2016 | Daijavad et al. | |
| 2017/0034720 A1 | 2/2017 | Gopalakrishnan et al. | |
| 2017/0054818 A1* | 2/2017 | Hassan | H04W 48/08 |
| 2017/0134972 A1 | 5/2017 | Lau | |
| 2017/0171752 A1* | 6/2017 | Lee | H04W 76/10 |
| 2017/0171782 A1* | 6/2017 | Mohamed | H04W 36/18 |
| 2017/0238203 A1 | 8/2017 | Dzierwa et al. | |
| 2017/0245176 A1* | 8/2017 | Murphy | H04W 24/04 |
| 2017/0245311 A1* | 8/2017 | Murray | H04W 12/02 |
| 2017/0250766 A1 | 8/2017 | Dzierwa et al. | |
| 2017/0289890 A1 | 10/2017 | Jung et al. | |
| 2017/0295086 A1 | 10/2017 | Dyszynski et al. | |
| 2017/0323343 A1* | 11/2017 | Dey | H04W 4/025 |
| 2017/0359748 A1 | 12/2017 | Fehske et al. | |
| 2017/0374573 A1 | 12/2017 | Kleinbeck et al. | |
| 2017/0374625 A1 | 12/2017 | Abdelmonem et al. | |
| 2018/0049039 A1 | 2/2018 | Chandrasekaran et al. | |
| 2018/0070277 A1 | 3/2018 | Sankaranarayanan | |
| 2018/0116006 A1 | 4/2018 | Karia et al. | |
| 2018/0152848 A1* | 5/2018 | Egner | H04W 76/18 |
| 2018/0167972 A1 | 6/2018 | Egner et al. | |
| 2018/0227921 A1* | 8/2018 | Liu | H04W 48/18 |
| 2018/0331908 A1 | 11/2018 | Gal et al. | |
| 2018/0368046 A1* | 12/2018 | Zhang | H04W 36/38 |
| 2019/0068443 A1 | 2/2019 | Li et al. | |
| 2019/0132206 A1* | 5/2019 | Hanes | H04L 41/14 |
| 2019/0200244 A1 | 6/2019 | Polepalli | |
| 2020/0167834 A1* | 5/2020 | Matsuoka | G06N 3/08 |
| 2021/0389407 A1* | 12/2021 | Park | H04B 17/318 |

\* cited by examiner

Table 5.5-1 E-UTRA operating bands

| E-UTRA Operating Band | Uplink (UL) operating band BS receive UE transmit $F_{UL\_low} - F_{UL\_high}$ | | Downlink (DL) operating band BS transmit UE receive $F_{DL\_low} - F_{DL\_high}$ | | Duplex Mode |
|---|---|---|---|---|---|
| 1 | 1920 MHz | 1980 MHz | 2110 MHz | 2170 MHz | FDD |
| 2 | 1850 MHz | 1910 MHz | 1930 MHz | 1990 MHz | FDD |
| 3 | 1710 MHz | 1785 MHz | 1805 MHz | 1880 MHz | FDD |
| 4 | 1710 MHz | 1755 MHz | 2110 MHz | 2155 MHz | FDD |
| 5 | 824 MHz | 849 MHz | 869 MHz | 894 MHz | FDD |
| 6[1] | 830 MHz | 840 MHz | 875 MHz | 885 MHz | FDD |
| 7 | 2500 MHz | 2570 MHz | 2620 MHz | 2690 MHz | FDD |
| 8 | 880 MHz | 915 MHz | 925 MHz | 960 MHz | FDD |
| 9 | 1749.9 MHz | 1784.9 MHz | 1844.9 MHz | 1879.9 MHz | FDD |
| 10 | 1710 MHz | 1770 MHz | 2110 MHz | 2170 MHz | FDD |
| 11 | 1427.9 MHz | 1447.9 MHz | 1475.9 MHz | 1495.9 MHz | FDD |
| 12 | 699 MHz | 716 MHz | 729 MHz | 746 MHz | FDD |
| 13 | 777 MHz | 787 MHz | 746 MHz | 756 MHz | FDD |
| 14 | 788 MHz | 798 MHz | 758 MHz | 768 MHz | FDD |
| 15 | Reserved | | Reserved | | FDD |
| 16 | Reserved | | Reserved | | FDD |
| 17 | 704 MHz | 716 MHz | 734 MHz | 746 MHz | FDD |
| 18 | 815 MHz | 830 MHz | 860 MHz | 875 MHz | FDD |
| 19 | 830 MHz | 845 MHz | 875 MHz | 890 MHz | FDD |
| 20 | 832 MHz | 862 MHz | 791 MHz | 821 MHz | FDD |
| 21 | 1447.9 MHz | 1462.9 MHz | 1495.9 MHz | 1510.9 MHz | FDD |
| 22 | 3410 MHz | 3490 MHz | 3510 MHz | 3590 MHz | FDD |
| 23 | 2000 MHz | 2020 MHz | 2180 MHz | 2200 MHz | FDD |
| 24 | 1626.5 MHz | 1660.5 MHz | 1525 MHz | 1559 MHz | FDD |
| 25 | 1850 MHz | 1915 MHz | 1930 MHz | 1995 MHz | FDD |
| 26 | 814 MHz | 849 MHz | 859 MHz | 894 MHz | FDD |
| 27 | 807 MHz | 824 MHz | 852 MHz | 869 MHz | FDD |
| 28 | 703 MHz | 748 MHz | 758 MHz | 803 MHz | FDD |
| 29 | N/A | | 717 MHz | 728 MHz | FDD[2] |
| 30 | 2305 MHz | 2315 MHz | 2350 MHz | 2360 MHz | FDD |
| 31 | 452.5 MHz | 457.5 MHz | 462.5 MHz | 467.5 MHz | FDD |
| 32 | N/A | | 1452 MHz | 1496 MHz | FDD[2] |
| 33 | 1900 MHz | 1920 MHz | 1900 MHz | 1920 MHz | TDD |
| 34 | 2010 MHz | 2025 MHz | 2010 MHz | 2025 MHz | TDD |
| 35 | 1850 MHz | 1910 MHz | 1850 MHz | 1910 MHz | TDD |
| 36 | 1930 MHz | 1990 MHz | 1930 MHz | 1990 MHz | TDD |
| 37 | 1910 MHz | 1930 MHz | 1910 MHz | 1930 MHz | TDD |
| 38 | 2570 MHz | 2620 MHz | 2570 MHz | 2620 MHz | TDD |
| 39 | 1880 MHz | 1920 MHz | 1880 MHz | 1920 MHz | TDD |
| 40 | 2300 MHz | 2400 MHz | 2300 MHz | 2400 MHz | TDD |
| 41 | 2496 MHz | 2690 MHz | 2496 MHz | 2690 MHz | TDD |
| 42 | 3400 MHz | 3600 MHz | 3400 MHz | 3600 MHz | TDD |
| 43 | 3600 MHz | 3800 MHz | 3600 MHz | 3800 MHz | TDD |
| 44 | 703 MHz | 803 MHz | 703 MHz | 803 MHz | TDD |
| 45 | 1447 MHz | 1467 MHz | 1447 MHz | 1467 MHz | TDD |
| 46 | 5150 MHz | 5925 MHz | 5150 MHz | 5925 MHz | TDD[1,2] |
| ... | | | | | |
| 64 | Reserved | | | | |
| 65 | 1920 MHz | 2010 MHz | 2110 MHz | 2200 MHz | FDD |
| 66 | 1710 MHz | 1780 MHz | 2110 MHz | 2200 MHz | FDD[2] |
| 67 | N/A | | 738 MHz | 758 MHz | FDD[2] |
| 68 | 698 MHz | 728 MHz | 753 MHz | 783 MHz | FDD |

NOTE 1: Band 6 is not applicable
NOTE 2: Restricted to E-UTRA operation when carrier aggregation is configured. The downlink operating band is paired with the uplink operating band (external) of the

FIG. 6

SYSTEM AND PROCESS FOR USING CELLULAR CONNECTIVITY ANALYSIS TO DETERMINE OPTIMAL WIRELESS EQUIPMENT AND SERVICE FOR A GEOGRAPHICAL AREA

CROSS-REFERENCE TO RELATED APPLICATIONS

This application is a continuation in part of U.S. application Ser. No. 16/548,264 filed on Aug. 22, 2019, which is hereby incorporated by reference in its entirety for all purposes as if fully set forth herein, which application claims the benefit of U.S. Provisional Application No. 62/721,871 filed on Aug. 23, 2018, which is hereby incorporated by reference in its entirety for all purposes as if fully set forth herein.

BACKGROUND OF THE DISCLOSURE

1. Field of the Disclosure

The disclosure relates to a system and process for using cellular connectivity analysis to determine optimal wireless equipment for a geographical area. The disclosure also relates to a system and process for using cellular connectivity analysis to determine optimal wireless service for a geographical area.

2. Related Art

A large number of wireless service plans and wireless devices exist for customers desiring wireless services such as data, talk, text messaging, and the like. The wireless providers of those services typically provide wireless services from a wireless network to the wireless device utilizing various wireless protocols over a communication channel. For example, wireless service from a wireless network may be allocated use of one or more particular bands. Each band may implement a particular duplex mode that may include one of Frequency Division Duplexing (FDD), Time division duplex (TDD), Supplemental Downlink (SDL), and/or the like. Each band may further include an operating frequency, a subset of bands, an uplink frequency, a downlink frequency, a duplex spacing, a channel bandwidth, and/or the like. The details of which are described in Tables 5.5-1 "E-UTRA Operating Bands" and 5.6.1-1 "E-UTRA Channel Bandwidth" of 3GPP TS 36.101. A reproduction of Table 5.5-1 "E-UTRA Operating Bands" is illustrated in FIG. 6. Typically, a particular wireless carrier may be allocated a portion of the various bands; and another particular wireless carrier may be allocated another portion of the various bands. This allocated portion of bands for a particular wireless service provider may not be optimal for a wireless user based on the user's wireless device, the user's geographic location, and the like. This results in less than optimal wireless service for some users.

A need exists to provide a wireless user with a wireless device and/or wireless service provider that provides the optimal wireless service as it relates to the user's geographic location.

SUMMARY OF THE DISCLOSURE

The foregoing needs are met, to a great extent, by the disclosure, providing a device, system, and method for using cellular connectivity analysis to determine optimal wireless equipment and/or wireless service for a geographical area. In this regard, cellular connectivity information may be collected from various wireless networks and/or wireless devices. Thereafter, the cellular connectivity information may be analyzed to ascertain whether wireless service from a particular wireless network that is implementing a particular allocation of different bands and technologies operating at various uplink and downlink frequencies in combination with a particular wireless device may be a cause for a particular wireless device to have poor performance in a particular geographic location. In this regard, a particular geographic location may be analytically extended to include various physical locations. For example, a particular geographic location may include a physical location such as indoors, near tall buildings, and the like.

One general aspect includes a system configured to analyze cellular connectivity information for at least one wireless network and at least one wireless device, the system including: a processor configured to receive cellular connectivity information from at least one wireless network for at least one wireless device; the processor further configured to receive geographic location information from the at least one wireless network for the at least one wireless device. The system also includes a database configured to store the cellular connectivity information, the geographic location information, and equipment type information related to the at least one wireless device. The system also includes the processor further configured to analyze the cellular connectivity information, the geographic location information, and the equipment type information related to the at least one wireless device. The system also includes the processor further configured to determine a wireless device having poor wireless service performance based on the analysis of the cellular connectivity information. The system also includes the processor further configured to output to a man machine interface the cellular connectivity information, the geographic location information, and the equipment type information related to the wireless device having poor wireless service performance.

One general aspect includes a process configured to analyze cellular connectivity information for at least one wireless network and at least one wireless device, the process including: receiving cellular connectivity information from at least one wireless network for at least one wireless device with a processor; receiving geographic location information from the at least one wireless network for the at least one wireless device with the processor. The process also includes storing the cellular connectivity information, the geographic location information, and equipment type information related to the at least one wireless device in a database. The process also includes analyzing the cellular connectivity information, the geographic location information, and the equipment type information related to the at least one wireless device with the processor. The process also includes determining a wireless device having poor wireless service performance with the processor based on the analysis of the cellular connectivity information. The process also includes outputting to a man machine interface the cellular connectivity information, the geographic location information, and the equipment type information related to the wireless device having poor wireless service performance with the processor.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will also form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

The above mentioned features and aspects of the disclosure will become more apparent with reference to the following description taken in conjunction with the accompanying drawings wherein like reference numerals denote like elements and in which:

FIG. 6 illustrates Table 5.5-1 listing "E-UTRA Operating Bands."

DETAILED DESCRIPTION

Figure 1:
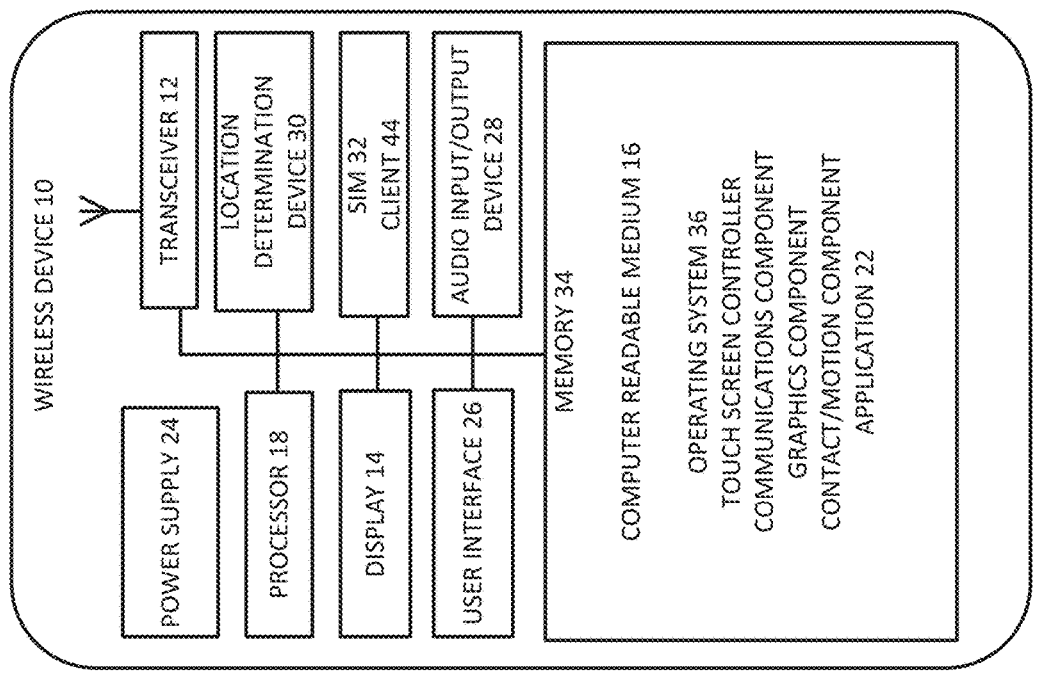
FIG. 1 illustrates an exemplary wireless device and its components, in accordance with aspects of the disclosure.

A large number of wireless service plans exist for customers desiring wireless services such as data, talk, and text messaging. To obtain these wireless services, customers generally have the option of entering into a post-paid service (e.g., contract for a period of time) or a pre-paid, contract-free service. The latter offers customers the freedom to initiate and stop wireless services without incurring expensive cancellation fees associated with a post-paid service.

Generally, companies that provide post-paid wireless services are wireless carriers or Mobile Network Operators (MNO) that maintain and control their own wireless networks. A MNO heavily relies on backend systems to address any provisional, billing, security, and data issues that might threaten the health of their networks. On the other hand, a Mobile Virtual Network Operator (MVNO) is a mobile operator that typically does not own its own frequency spectrum or have its own network infrastructure. MVNOs negotiate and enter into business agreements with third party wireless carriers or MNOs to purchase the right to use their networks for wireless services including volume of data, number of minutes of airtime/voice, and number of text messages used. In this regard, MVNOs may have a plurality of agreements with and the rights to use a plurality of MNO networks.

Convenience, timeliness, cost, service, and reliability of a wireless device and/or the wireless providers' systems and services are key factors that play into a user's experience. By developing a system to improve at least these factors, a more positive experience can be provided to the wireless user. The improved experience will help retain customer base and increase the number of customers willing to purchase wireless services. In order to do so, the following needs can be addressed by a system and process for using cellular connectivity analysis to determine optimal wireless equipment and wireless service for a geographical area that may be utilized by either MNOs or MVNOs.

In this disclosure and claims it is to be understood that reference to a wireless device is intended to encompass electronic devices such as mobile phones, tablet computers, gaming systems, MP3 players, personal computers, PDAs, and the like. A "wireless device" is intended to encompass any compatible mobile technology computing device that can connect to a wireless communication network, such as mobile phones, mobile equipment, mobile stations, user equipment, cellular phones, smartphones, handsets, or the like (e.g., Apple iPhone, Google Android based devices, BlackBerry based devices, other types of PDAs or smartphones), wireless dongles, remote alert devices, Internet of things (IoT) based wireless devices, or other mobile computing devices that may be supported by a wireless network. The term "wireless device" may be interchangeably used and referred to herein as "wireless handset," "handset," "mobile device," "device," "mobile phones," "mobile equipment," "mobile station," "user equipment," "cellular phone," "smartphones," "monitoring device" or "phone."

Wireless devices may connect to a "wireless network" or "network" and are intended to encompass any type of wireless network to obtain or provide mobile phone services through the use of a wireless device, such as the Global System for Mobile Communication (GSM) network, Code-Division Multiple Access (CDMA) network, Long-Term Evolution (LTE) network, 4G, 5G, a Wi-Fi network, a network implementing a communication channel as defined herein, and the like that may utilize the teachings of the disclosure.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described, which may be requirements for some aspects but not for other aspects.

FIG. 1 illustrates an exemplary wireless device and its components, in accordance with aspects of the disclosure. In particular, FIG. 1 illustrates an exemplary wireless device 10. The wireless device 10 may include a transceiver 12, a display 14, a computer readable medium 16, a processor 18, an application 22, and/or the like. The transceiver 12 can include, for example, a wireless antenna and associated circuitry capable of data transmission with a mobile data network utilizing at least one data transmission protocol utilizing one or more communication channels as defined herein. The transceiver 12 may transmit and receive data utilizing the data transmission protocol. Moreover, the transceiver 12 may provide voice and text message capabilities. In one aspect, the processor 18 and/or the transceiver 12 may be implemented as a wireless device chipset.

The display 14 of the wireless device 10 may be configured to display various information provided to the display 14 from the processor 18 of the wireless device 10, the computer readable medium 16, the application 22, and/or the like. The screen may be a light-emitting diode display (LED), an electroluminescent display (ELD), a plasma display panel (PDP), a liquid crystal display (LCD), an organic light-emitting diode display (OLED), an active-matrix organic light-emitting diode (AMOLED) display, an IPS (In-plane switching) liquid crystal display (LCD), or any other display technology.

The displayed information can include, for example, a graphical user interface for displaying icons, the network connection strength, the type of mobile network data connection (such as 3G, 4G LTE, EVDO, Wi-Fi, etc.) the wireless device 10 is connected to, and/or other information potentially useful to the user. The information may be displayed simultaneously or the user may interact with an input device such as buttons on the wireless device 10 or, if the display 14 is a touch-screen, with the icons on the display 14 to cycle through the various types of information for display.

The wireless device 10 may also have a power supply 24. The power supply 24 may be a battery such as nickel cadmium, nickel metal hydride, lead acid, lithium ion, lithium ion polymer, and the like. The wireless device 10 may also include a memory 34, which could be an internal memory and/or a removable storage type such as a memory chip. The memory 34 may store information about the wireless device 10, including wireless profiles and settings. Additionally, the wireless device 10 may include an audio input/output device 28 for the input or output of sounds in videos, music, and the like.

The wireless device 10 may also have a user interface 26 to facilitate use of the wireless device 10 with an operating system 36. The operating system 36 may be associated with a touchscreen controller, one or more communications components, one or more graphics components, one or more contact/motion components, and the like.

In some aspects, the wireless device 10 and/or a wireless network 102 may estimate the location of the wireless device 10 based, at least in part, on a global navigation satellite system (GNSS) with a location determination device 30. In another aspect, a wireless network 102 may secure location determination based on a specific cell in which the wireless device 10 connects. In yet another aspect, a wireless network 102 may obtain location determination based on triangulation with respect to a plurality of cells in which the wireless device 10 receives signals. In yet another aspect, a wireless network 102 may obtain location determination based on a Location Area Code (LAC) for the wireless device 10. In yet another aspect, a wireless network 102 may obtain location determination based on a current cell tower identification (ID) that the wireless device 10 connects.

Figure 2:
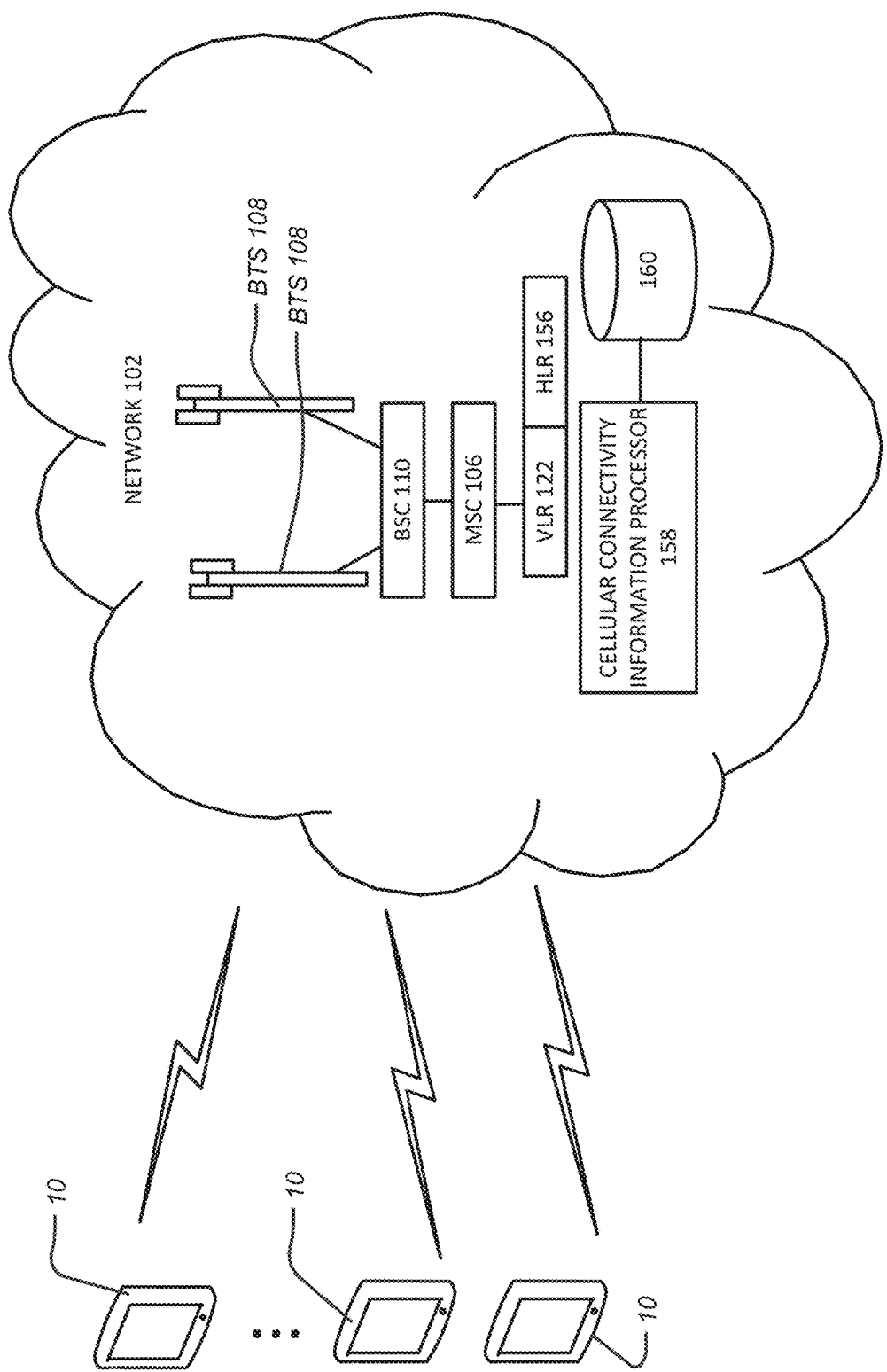
FIG. 2 illustrates an exemplary wireless network, in accordance with aspects of the disclosure.

FIG. 2 illustrates an exemplary wireless network, in accordance with aspects of the disclosure.

In particular, FIG. 2 shows a wireless network 102 that may include a Mobile services Switching Center (MSC) 106 that may perform the switching of calls and that may include a Visitor Location Register (VLR) 122. The wireless network 102 may also include a Base Transceiver Station (BTS) 108 and a Base Station Controller (BSC) 110. The Base Transceiver Station (BTS) 108 houses the radio transceivers that define a cell and handle the radio-link protocols with the wireless device 10. The Base Station Controller (BSC) 110 may manage the radio resources for one or more Base Transceiver Station (BTS) 108. The Base Station Controller (BSC) 110 may be the connection between the wireless device 10 and the Mobile service Switching Center (MSC) 106.

A Home Location Register (HLR) 156 and the Visitor Location Register (VLR) 122 together with the Mobile services Switching Center (MSC) 106 may provide the call-routing and roaming capabilities. The Home Location Register (HLR) 156 may contain all the administrative information of each subscriber registered in the corresponding network 102, along with the current location of the wireless device 10.

The wireless network 102 may include a home subscriber server (HSS), a user profile server function (UPSF), and/or the like. The HSS may be a master user database that supports IP Multimedia Core Network Subsystem (IMS) network entities. It may contain the subscription-related information (subscriber profiles), perform authentication and authorization of the user, and can provide information about the subscriber's location and IP information.

The wireless network 102 may include Unified Data Management (UDM). The UDM may be configured to manage network user data in a single, centralized element. In some aspects, the UDM may be configured similar to a 4G network home subscriber service (HSS) and the 3G network home location register (HLR). In some aspects, the UDM may be configured as a cloud-native configuration and designed for 5G specifically.

The wireless network 102 may further include a switch. The switch may be implemented by one or more of the Mobile services Switching Center (MSC) 106, the Home Location Register (HLR) 156, the Visitor Location Register (VLR) 122, the Base Transceiver Station (BTS) 108, the Base Station Controller (BSC) 110, the home subscriber server (HSS), the Unified Data Management (UDM), a separate component, and/or the like.

The wireless network 102 may include a radio access network (RAN). The radio access network (RAN) may be implemented as part of a mobile telecommunication system of the wireless network 102. The radio access network (RAN) may implement a radio access technology. The radio access network (RAN) may reside between the wireless device 10 and the wireless network 102 and may provide a connection with a core network (CN).

Additionally, the wireless network 102 may be configured to obtain cellular connectivity information. The cellular connectivity information may be obtained from one or more of the switch, the Mobile services Switching Center (MSC) 106, the Home Location Register (HLR) 156, the Visitor Location Register (VLR) 122, the home subscriber server (HSS), the Unified Data Management (UDM), a cellular connectivity information processor, a cellular connectivity information server, and/or the like. For brevity of the disclosure, hereinafter the cellular connectivity information may be referred to as being obtained from a cellular connectivity information processor 158. The cellular connectivity information processor 158 may include a database 160 to store the collected cellular connectivity information. In one aspect, the cellular connectivity information processor 158 may obtain at least some of the cellular connectivity information directly. In one aspect, the cellular connectivity information processor 158 may obtain at least some of the cellular connectivity information from one or more components of the wireless network 102. In one aspect, the cellular connectivity information processor 158 may obtain at least some of the cellular connectivity information from one or more wireless devices 10.

The cellular connectivity information may include one or more of the following: whether the wireless device 10 is registered to the Radio Access Network; a current cell tower identification (ID) that the wireless device 10 connects; a Location Area Code (LAC) for the wireless device 10; a signal strength (dB) for the wireless device 10 and/or the wireless network 102; a Signal-to-Noise Ratio (SNR) for the wireless device 10 and/or the wireless network 102; an LTE RSSI (Received Signal Strength Indicator) for the wireless device 10 and/or the wireless network 102; an LTE RSRQ (Reference Signal Received Quality) for the wireless device 10 and/or the wireless network 102; an LTE SINR (Signal to Interference & Noise Ratio) for the wireless device 10 and/or the wireless network 102; an LTE CQI (Channel Quality Indicator) for the wireless device 10 and/or the wireless network 102; a RSRP (Reference Signal Received Power) for the wireless device 10 and/or the wireless network 102; a data latency for the wireless device 10 and/or the wireless network 102; jitter for the wireless device 10 and/or the wireless network 102; a data throughput for the wireless device 10 and/or the wireless network 102; and/or the like.

In some aspects, the RSRP and the RSRQ may be measures of a signal level and quality for the wireless device 10 and/or the wireless network 102. In the wireless network 102, when the wireless device 10 moves from cell to cell and performs cell selection/reselection and handover, the wireless device 10 may measure the signal strength/quality. In aspects, the wireless network 102 and/or the wireless device 10 may measure parameters with respect to a reference signal that may include the RSRP (Reference Signal Received Power), the RSRQ (Reference Signal Received Quality), or the like.

The carrier RSSI (Receive Strength Signal Indicator) may measure the average total received power observed in OFDM (Orthogonal frequency-division multiplexing) symbols containing reference symbols. The parameters may also include the Reference Signal Received Power (RSRP). The RSRP may be considered a RSSI type of measurement. The RSRP may be interpreted as the power of the LTE Reference Signals spread over a full bandwidth, a narrowband, and/or the like.

The Reference Signal Received Quality (RSRQ) may use the number of used Resource Blocks (N) and may be defined as RSRQ=(N*RSRP)/RSSI measured over the same bandwidth. The RSRQ may indicate the quality of the received reference signal.

In some aspects, the RSRP (Reference Signal Receive Power) may be defined as the average power of Resource Elements (RE) that carry cell specific Reference Signals (RS) over the entire bandwidth.

In some aspects, data latency may be a time it takes for data to be transferred between its original source and its destination. For example, a time it takes for data to be transferred between the wireless device 10 and the wireless network 102.

In some aspects, jitter can be defined as a varied delay between received packets. For example, a varied delay between received packets transferred between the wireless device 10 and the wireless network 102.

In some aspects, data throughput can be defined as an amount of information that can be transmitted across an interface is often interchangeably referred to as "signaling rate," "data rate" or "throughput." For example, an amount of information that can be transmitted between the wireless device 10 and the wireless network 102.

In some aspects, some of the cellular connectivity information may be measured by the transceiver 12 of the wireless device 10, the processor 18 of the wireless device 10, and/or the like. This information obtained by the wireless device 10 may be transmitted to the wireless network 102 and forwarded to the cellular connectivity information processor 158. Other parts of the cellular connectivity information may be measured by the transceivers of the wireless network 102, the radio access network (RAN) of the wireless network 102, the cellular connectivity information processor 158, or other components of the wireless network 102 as described herein. In some aspects, the information obtained by the wireless network 102 may be forwarded to the cellular connectivity information processor 158. In this regard, the cellular connectivity information processor 158 may collect this information and store the collected cellular connectivity information in the database 160 for subsequent retrieval.

Figure 3:
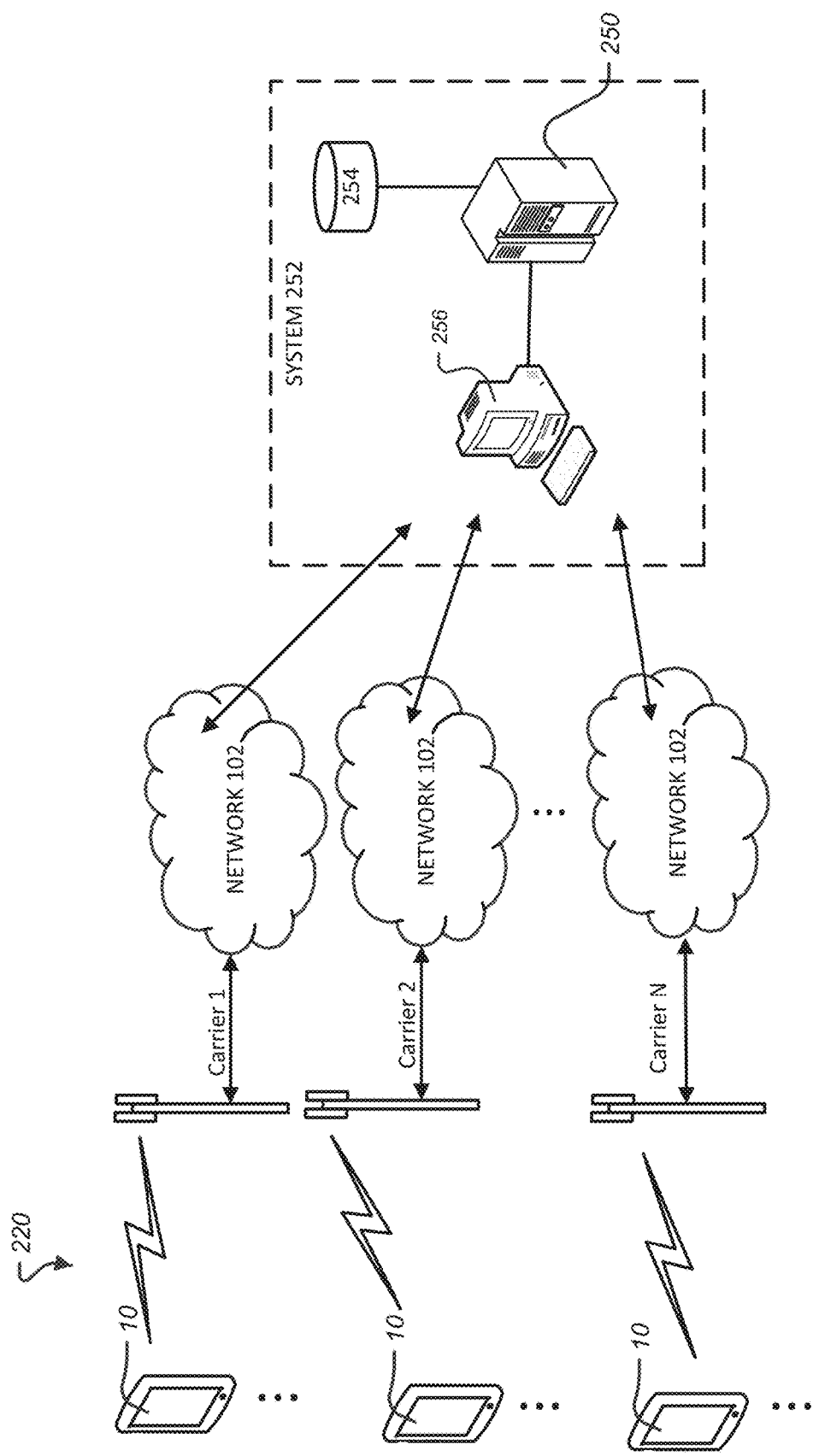
FIG. 3 illustrates a system as well as wireless devices that may connect with one of a plurality of networks and service providers, in accordance with aspects of the disclosure.

FIG. 3 illustrates a system in which wireless devices may connect with one of a plurality of networks and service providers, in accordance with aspects of the disclosure.

In particular, FIG. 3 illustrates wireless devices 10 connecting to various wireless networks 102. The various wireless networks 102 may include one or more of the functions, components, and the like described herein. The type of service provided by the wireless networks 102 may include data, voice, text, SMS, and the like. The variety of available carriers associated with the one or more wireless networks 102 are represented in FIG. 3 by carrier 1, carrier 2, . . . carrier N. Where N is a positive integer. In other words, there may be N different wireless networks or carriers. In this regard, one wireless network 102/carrier may implement a different allocation of wireless bands with respect to another wireless network 102/carrier. A wireless network 102 may have its own subscriber profile repository, which can verify a wireless user account associated with the wireless device 10. When the wireless device 10 has been authenticated on a wireless network 102, the wireless device 10 may connect to a gateway support node associated with the wireless network 102 to receive wireless services including data, voice, text, SMS, and/or other wireless services available to the wireless device 10 on the wireless network 102. The gateway support node may also operatively link the wireless device 10 to communicate billing and policy services associated with the wireless network 102. Additionally, each of the wireless networks 102 may include a cellular connectivity information processor 158 and database 160 implemented as described herein to collect cellular connectivity information.

The system of FIG. 3 may further include a system 252, which may employ a processor 250 to receive cellular connectivity information from each of the wireless networks 102 and store the cellular connectivity information in a database 254. In one aspect, the processor 250 may receive cellular connectivity information from each cellular connectivity information processor 158 implemented by each wireless network 102 and store the cellular connectivity information in a database 254. The processor 250 may implement one or more processors, servers, or the like. The system 252 may be cloud-based, network-based, or the like. In one aspect, the system 252 may be a cellular connectivity information system. In one aspect, the processor 250 may be a cellular connectivity information processor. In one aspect, the system 252 may be implemented by a MVNO. In one aspect, the system 252 may be implemented by a MNO. In one aspect, the system 252 may be implemented by a third party.

In particular, the processor 250 may include an Application Programming Interface (API) and/or the cellular connectivity information processor 158 may include Application Programming Interface (API). More specifically, the processor 250 and the cellular connectivity information processor 158 may include one or more Application Programming Interfaces (API) such that the processor 250 receives the cellular connectivity information from the cellular connectivity information processor 158 and/or the database 160 of each of the wireless networks 102. The database 254 may receive the cellular connectivity information from the processor 250 and/or the cellular connectivity information processor 158 and store the same.

As noted above, the cellular connectivity information may include one or more of the following: whether the wireless device 10 is registered to the Radio Access Network; a current cell tower identification (ID) that the wireless device 10 connects; a Location Area Code (LAC) for the wireless device 10; a signal strength (dB) for the wireless device 10 and/or the wireless network 102; a Signal-to-Noise Ratio (SNR) for the wireless device 10 and/or the wireless network 102; an LTE RSSI (Received Signal Strength Indicator) for the wireless device 10 and/or the wireless network 102; an LTE RSRQ (Reference Signal Received Quality) for the wireless device 10 and/or the wireless network 102; an LTE SINR (Signal to Interference & Noise Ratio) for the wireless device 10 and/or the wireless network 102; an LTE CQI (Channel Quality Indicator) for the wireless device 10 and/or the wireless network 102; a RSRP (Reference Signal Received Power) for the wireless device 10 and/or the wireless network 102; a data latency for the wireless device 10 and/or the wireless network 102; jitter for the wireless device 10 and/or the wireless network 102; a data throughput for the wireless device 10 and/or the wireless network 102; and/or the like.

Additionally, the cellular connectivity information may include this information associated with each wireless subscriber. Accordingly, the database 254 may store the cellular connectivity information together with an identification that associates it to each wireless subscriber and the wireless device 10 associated with each wireless subscriber. In particular, the database 254 may store user equipment information associated with each wireless subscriber. In particular, the user equipment information associated with each wireless subscriber may include the type of wireless device 10 being utilized by each wireless subscriber.

The processor 250 may be configured analyze the cellular connectivity information at a per wireless subscriber level in order to troubleshoot wireless user technical problems, address business needs, and the like. For example, the processor 250 may be configured to analyze the cellular connectivity information in order to better troubleshoot subscriber technical problems based on one or more of: the Signal Strength (dB), the Signal-to-Noise Ratio (SNR), the LTE RSSI (Received Signal Strength Indicator), the LTE RSRQ (Reference Signal Received Quality), the LTE SINR (Signal to Interference & Noise Ratio), the LTE CQI (Channel Quality Indicator), and the like in association with the geographic location of the subscriber and the type of wireless equipment.

The geographic location of the subscriber/wireless device 10 may be based on a current cell tower identification (ID) that the wireless device 10 connects, a Location Area Code (LAC) for the wireless device 10, location information provided by the wireless device 10, or the like. The location information may be provided by the wireless device 10 and may be provided by a location determination device 30. The location information may be provided to the wireless network 102 and stored by the cellular connectivity information processor 158 in the database 160.

In this regard, the analysis by the processor 250 may include statistical analysis on the cellular connectivity information to determine a mean, standard deviation, and the like for each type of the cellular connectivity information. The statistical analysis may be associated with the geographic location of the wireless device 10 of a subscriber and/or associated with the type of wireless equipment.

Thereafter, the processor 250 may further determine causality, and in particular draw a conclusion on an effect of independent variables on dependent variables with respect to the cellular connectivity information, the geographic location, and the wireless equipment type. More specifically, the cellular connectivity information may be analyzed to ascertain whether wireless service from a particular wireless network 102 that is implementing a particular allocation of different bands and technologies operating at various uplink and downlink frequencies may be the cause for a particular wireless device 10 to have poor performance in a particular geographic location.

The processor 250 may alternatively and/or further utilize artificial intelligence. In some aspects, the processor 250 may utilize artificial intelligence to set and redefine thresholds of cellular connectivity information to ascertain poor performance in order to determine whether implementing a particular allocation of different bands and technologies operating at various uplink and downlink frequencies may be the cause for a particular wireless device 10 to have poor performance in a particular geographic location.

The artificial intelligence may utilize any number of approaches including one or more of cybernetics and brain simulation, symbolic, cognitive simulation, logic-based, anti-logic, knowledge-based, sub-symbolic, embodied intelligence, computational intelligence and soft computing, machine learning and statistics, and the like.

The analysis generated by the processor 250 may include determining which combination of particular types of wireless devices 10, particular wireless networks 102, and particular geographic locations result in poor performance.

In one aspect, poor performance relates to one of the factors of the cellular connectivity information that is below a mean of one of the factors of the cellular connectivity information for all wireless devices 10 and wireless networks 102.

In one aspect, poor performance relates to a plurality of the factors of the cellular connectivity information that are below a mean of a plurality of the factors of the cellular connectivity information for all wireless devices 10 and wireless networks 102.

In one aspect, poor performance relates to a majority of the factors of the cellular connectivity information that are below a mean of the majority of the factors of the cellular connectivity information for all wireless devices 10 and wireless networks 102.

In one aspect, poor performance relates to the factors of the cellular connectivity information that are below a predetermined threshold of performance.

In one aspect, poor performance relates to one of the factors of the cellular connectivity information that is below a predetermined threshold of performance.

In one aspect, poor performance relates to a plurality of the factors of the cellular connectivity information that are below a predetermined threshold of performance.

In one aspect, poor performance relates to the majority of the factors of the cellular connectivity information that are below a predetermined threshold of performance.

Performance may be based on the factors related to the cellular connectivity information and geographic location of the wireless device 10. In other words, the processor 250 may determine which wireless devices 10 and associated wireless networks 102 operate poorly in particular geographic locations.

In a similar manner, the processor 250 may include determining which combination of particular types of wireless devices 10 and wireless networks 102 for particular geographic locations result in superior performance. For example, performance that is above the mean performance for all wireless devices 10 and wireless networks 102 as described above; and/or performance that is above a performance threshold as described above. In other words, the processor 250 may determine which wireless devices 10 and associated wireless networks 102 operate more effectively in particular geographic locations.

The processor 250 may further ascertain that a wireless device in a particular geographic location operating with poor performance with a first one of the wireless networks 102 may operate with improved performance if operated with a second one of the wireless networks 102. The analysis generated by the processor 250 may be output to a man machine interface 256 that may include a computer, a display, a printer, and/or the like. The analysis generated by the processor 250 may be output to a display device, a printer, transmitted over a network, or the like. In one aspect, the analysis generated by the processor 250 may be output to a display device to assist technical support to obtain solutions to address the poor performance. In one aspect, the analysis generated by the processor 250 may be transmitted over a network to assist technical support to obtain solutions to address the poor performance.

In additional aspects, the processor 250 may be utilized for various business implementations. For example, the processor 250 may determine whether the wireless device 10 is registered to the Radio Access Network. In this regard, the processor 250 may determine that a customer's wireless device 10 is attached to the wireless network 102, the processor 250 can utilize the above-noted statistical and/or artificial intelligence process to better understand a customer's behavior, determine whether to send or not send the customer over the air (OTA) marketing messages and the like. In one aspect, the marketing messages may include one or more of the following: text message marketing messages, SMS marketing messages, MMS marketing messages, in application marketing messages, email marketing messages, and the like.

In another aspect, the processor 250 may determine the current cell tower identification for a wireless device user. In this regard, the processor 250 can utilize the above-noted statistical and/or artificial intelligence processes to better understand a customer's behavior, know when and where they are using their wireless devices, concentrate marketing efforts accordingly, analyze the impact of marketing efforts, and the like. This analysis and information results in the ability to provide superior service to customers.

In another aspect, the processor 250 may determine the Location Area Code (LAC) for a wireless device user. In this regard, the processor 250 can utilize the above-noted statistical and artificial intelligence processes to better understand a customer's behavior, know when and where they are using their wireless devices, concentrate marketing efforts accordingly, analyze the impact of marketing efforts, and the like. Likewise, this analysis and information results in the ability to provide superior service to customers.

Figure 4:
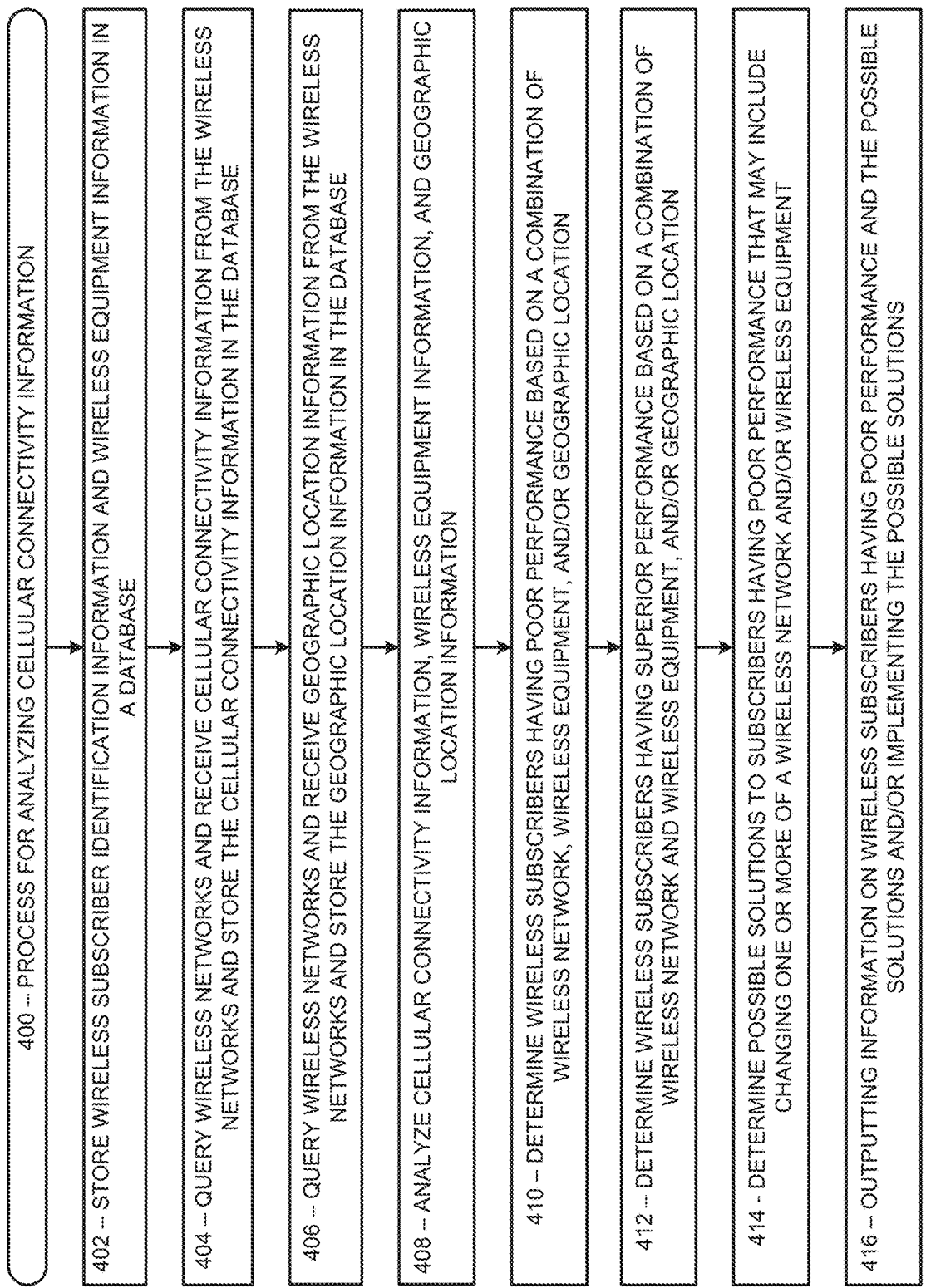
FIG. 4 illustrates a process for obtaining and analyzing cellular connectivity information, in accordance with aspects of the disclosure.

FIG. 4 illustrates a process for obtaining and analyzing cellular connectivity information, in accordance with aspects of the disclosure.

In particular, FIG. 4 illustrates a process for analyzing cellular connectivity information 400, which may be implemented at least in part by the system 252, the processor 250, and/or the database 254, and/or a similar system. In one aspect, the process 400, the processor 250, and/or the database 254 may be implemented by a MVNO. In one aspect, the process 400, the processor 250, and/or the database 254 may be implemented by a MNO. In one aspect, the process 400, the processor 250, and/or the database 254 may be implemented by a third party.

In box 402, the system 252 may store wireless subscriber identification information and wireless equipment information in a database, such as the database 254. When the system 252 is implemented by a MVNO, this information is available from the wireless device identification information associated with subscriber accounts. In other aspects, this information can be obtained from the associated MNO or from the wireless network 102.

In box 404, the system 252 may query the wireless networks 102 and receive cellular connectivity information from the wireless networks 102 and store the cellular connectivity information in the database 254. For example, the query may be implemented by the Application Programming Interface (API) and associated processes as described herein. In one aspect, the system 252 may query each cellular connectivity information processor 158 of each of the wireless networks 102 and receive cellular connectivity information from the wireless networks 102 and store the cellular connectivity information in the database 254.

In box 406, the system 252 may query wireless networks and receive geographic location information from the wireless networks and store the geographic location information in the database 254. For example, the query may be implemented by the Application Programming Interface (API) and associated processes as described herein. In one aspect, the system 252 may query each cellular connectivity information processor 158 of each of the wireless networks 102 and receive geographic location information from the wireless networks 102 and store the cellular connectivity information in the database 254.

In box 408, the system 252 may analyze cellular connectivity information, wireless equipment information, and geographic location information. In particular, the processor 250 may utilize the statistical and/or artificial intelligence processes as described herein.

In box 410, the system 252 may determine wireless subscribers having poor performance based on one or a combination of wireless network, wireless equipment, geographic location, and/or the like. In particular, the processor 250 may utilize the statistical and/or artificial intelligence processes as described herein.

In box 412, the system 252 may determine wireless subscribers having superior performance based on one or a combination of wireless network and wireless equipment, geographic location, and/or the like. In particular, the processor 250 may utilize the statistical and/or artificial intelligence processes as described herein.

In box 414, the system 252 may determine possible solutions to subscribers having poor performance that may include changing one or more of a wireless network, wireless equipment, and/or the like. In particular, the processor 250 may utilize the statistical and/or artificial intelligence processes as described herein.

In box 416, the system 252 may output information on wireless subscribers having poor performance and the possible solutions and/or implementing the possible solutions. In one aspect, the wireless user having poor performance in a particular geographic location may be advised to modify their wireless device and/or their wireless network to be consistent with a wireless user having superior performance in the same particular geographic location. The output information by the processor 250 may be output to the man machine interface 256 such as a display device, a printer, and the like, transmitted over a network, or the like. In one aspect, the information generated by the processor 250 may be output to the man machine interface 256 such as a display device to assist technical support to obtain solutions to address the poor performance. In one aspect, the output information generated by the processor 250 may be transmitted over network to assist technical support to obtain solutions to address the poor performance.

In one aspect, a solution to improving poor performance may be achieved by modifying a network that the wireless device connects. Modifying the network that the wireless device connects to may be implemented by a network modification process. The network modification process may be performed at least in part by the system 252. The system 252 may determine that one or more wireless users would benefit from changing or modifying networks. Thereafter, the system 252 may implement changes to the network settings for the wireless device 10.

Modifying network settings by the system 252 for the wireless device 10 may include establishing a user profile and/or a general profile, each profile possibly based at least in part on a geographic location of the wireless device 10 and/or other factors such as type of wireless device 10 use. The profile data may be stored in the database 254. The system 252 may modify network settings based on factors such as location, and may transmit those settings to the wireless device 10. In one example, at a particular time and/or location, the system 252 may transmit to the wireless device 10 network modification settings and/or profiles to implement on the wireless device 10. The wireless device 10 may receive those network modification settings from the system 252 through a connection to the wireless network 102, which may connect to the system 252, and may implement those network modification settings on the wireless device 10. The wireless device 10 may automatically implement the network modification settings and/or profiles on the wireless device 10.

In a particular aspect, the application 22 may be configured to modify a network to which the wireless device 10 connects by modifying network settings. In one aspect, the application 22 may be configured to modify a network to which the wireless device 10 connects by modifying network settings of a SIM 32. The processor 18 and/or the application 22 on the wireless device 10 may modify the network settings on the wireless device 10 so that the wireless device 10 connects to a particular wireless network 102 based on the process 400 described above and/or on a variety of factors such as time, location, type of wireless device 10 use, cost, MVNO preference, and the like.

In one aspect, the application 22 may modify network settings on the wireless device 10 with the processor 18 and/or the application 22 in response to instructions from the processor 250 of the system 252. In one aspect, the application 22 may modify network settings on the wireless device 10 with the processor 18 and/or the application 22 in response to instructions from the processor 250 of the system 252 utilizing Over-the-Air (OTA) programming.

In one aspect, the OTA may include various methods of modifying network settings, distributing new software, modifying configuration settings, updating encryption keys, and the like. In one aspect, the OTA may include one or more of over-the-air service provisioning (OTASP), over-the-air provisioning (OTAP), over-the-air parameter administration (OTAPA), provisioning the wireless device 10 with settings with which to access services such as wireless access point (WAP), MMS, and/or the like.

Returning to FIG. 1, the computer readable medium 16 may be configured to store the application 22. For the purposes of this disclosure, computer readable medium 16 stores computer data, which may include computer program code that may be executable by the processor 18 of the wireless device 10 in machine-readable form. By way of example, and not limitation, the computer readable medium 16 may include computer readable storage media, for example tangible or fixed storage of data, or communication media for transient interpretation of code-containing signals. Computer readable storage media, as used herein, refers to non-transitory physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a computer readable medium 16 or machine-readable medium, which may be incorporated into a computer program product.

The processor 18 may be configured to execute the application 22. The processor 18 can be, for example, dedicated hardware as defined herein, a computing device as defined herein, a processor, a wireless device processor, a microprocessor, a wireless device chipset, a central processing unit (CPU), a programmable logic array (PLA), a programmable array logic (PAL), a generic array logic (GAL), a complex programmable logic device (CPLD), an application-specific integrated circuit (ASIC), a field-programmable gate array (FPGA), any other programmable logic device (PLD), and/or the like configurable to execute the application 22.

The wireless device 10 may use a subscriber identity module (SIM) card 32. The SIM 32 may vary in size and may be a micro, mini, nano size, or any size SIM 32. The SIM 32 may be associated with a client 44, which may manage SIMs 32 to control which wireless networks the wireless device 10 may connect. The SIM 32 may store network-specific information used to authenticate and identify subscribers on the network including one or more of an integrated circuit card identifier (ICCID), International Mobile Subscriber Identity (IMSI), Authentication Key (Ki), Local Area Identity (LAI), Operator-Specific Emergency Number, and/or the like. The SIM 32 may also store other carrier-specific data such as the SMSC (Short Message Service Center) number, Service Provider Name (SPN), Service Dialing Numbers (SDN), Advice-Of-Charge parameters, Value Added Service (VAS) applications, and/or the like. The SIM 32 may be identified by its ICCID. ICCIDs may be stored in the SIM cards. The ICCID is defined by the ITU-T recommendation E.118 as the Primary Account Number. The SIM 32 layout may be based on ISO/IEC 7812. In some aspects, the SIM 32 may also be a soft SIM, electronic SIM, or embedded SIM. In some aspects, other memory locations of the wireless device 10 may store carrier-specific data such as the International Mobile Subscriber Identity (IMSI), Authentication Key (Ki), Local Area Identity (LAI), Operator-Specific Emergency Number, the SMSC (Short Message Service Center) number, Service Provider Name (SPN), Service Dialing Numbers (SDN), Advice-Of-Charge parameters, Value Added Service (VAS) applications, and/or the like.

The application 22 may be written in any programming language, such as, for example, C, Java, Objective-C, C+, Python, Visual Basic, Perl, or any other programming language the processor 18 is capable of executing. The application 22 may be made available by a system 252, may be downloaded by the wireless device 10 from the system 252, may be stored on a chipset, the SIM 32 of the wireless device 10, stored in the memory 34, may be part of the system bios of the wireless device 10, downloaded from an application store, downloaded from a digital distribution source, and/or the like.

Figure 5:
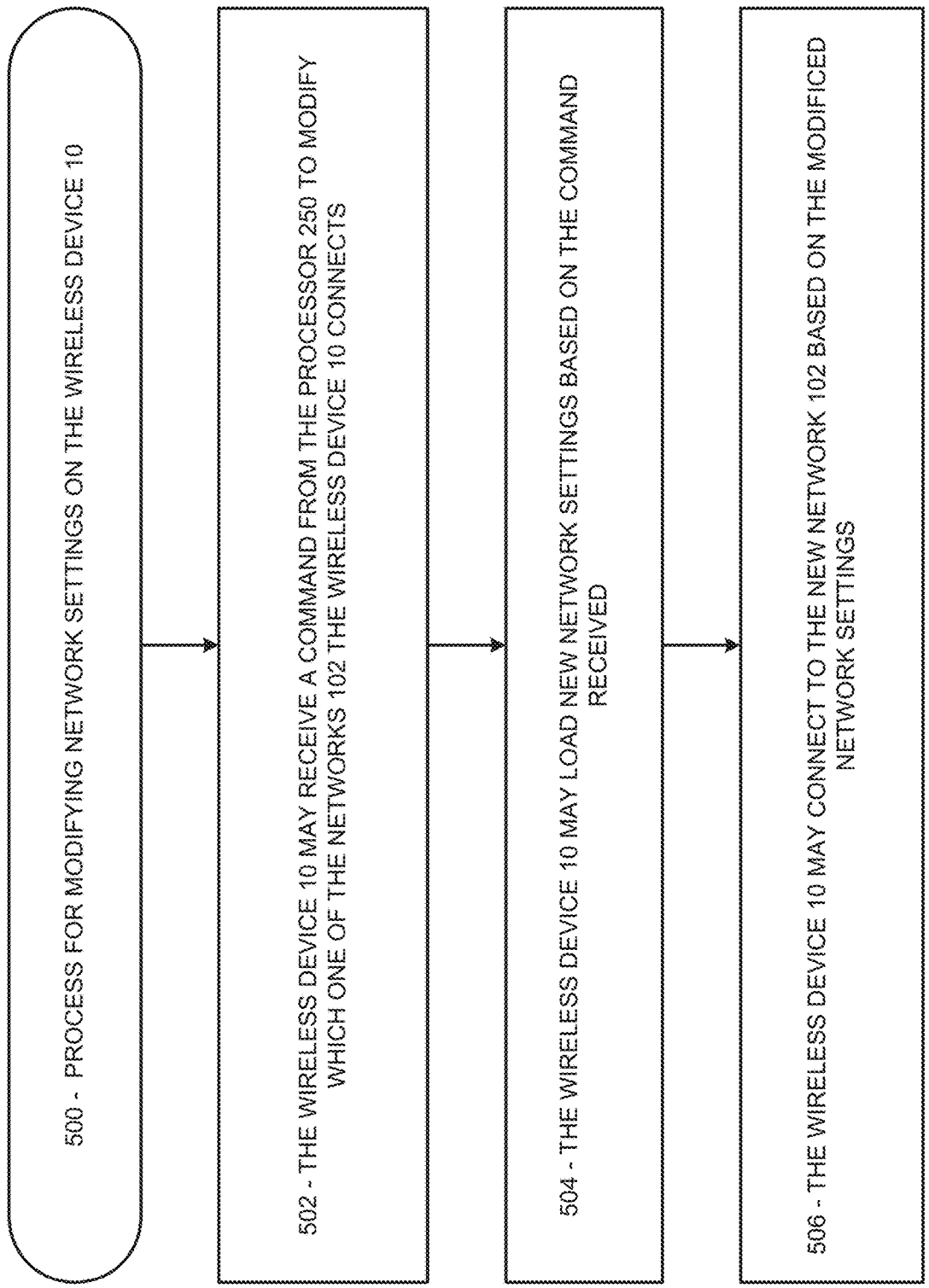
FIG. 5 illustrates a process for modifying wireless network access for a wireless device, in accordance with aspects of the disclosure.

FIG. 5 illustrates a process for modifying wireless network access for a wireless device, in accordance with aspects of the disclosure.

FIG. 5 illustrates a process 500 for modifying network settings on the wireless device 10 using the wireless device 10 once the network modification settings have been determined and have been received by the wireless device 10. In particular, FIG. 5 illustrates a process 500 for modifying network settings on the wireless device 10, which may be implemented at least in part by the system 252, the processor 250, and/or the database 254, and/or a similar system. In one aspect, the process 500, the processor 250, and/or the database 254 may be implemented by a MVNO. In one aspect, the process 500, the processor 250, and/or the database 254 may be implemented by a MNO. In one aspect, the process 500, the processor 250, and/or the database 254 may be implemented by a third party.

Starting at box 502, the wireless device 10 may receive a command from the processor 250 to modify which one of the wireless networks 102 the wireless device 10 connects. The command from the processor 250 may be any type of communication that the application 22 or the wireless device 10 is responsive. For example, the command may be an over the air (OTA) communication, an application push, an application pull, SMS communication, or the like. For example, the command may be an over-the-air service provisioning (OTASP), over-the-air provisioning (OTAP), over-the-air parameter administration (OTAPA), or the like provisioning of the necessary network settings with which to access services from a desired wireless network 102.

The application 22 may be configured as a provisioning client capable of receiving, processing and setting the parameters associated with modifying a network. For example, the application 22 may be a Device Management client capable of receiving and provisioning applications, connectivity parameters, or the like. In general, the term OTA implies the use of wireless mechanisms to send provisioning data or update packages for firmware or software updates to the wireless device 10 to modify network settings.

The process 500 may continue to box 504 where the wireless device 10 may load the new network settings based on the command received at box 502. The network settings may be based on the profiles generated by the system 252. The network settings may also be based on the location and/or time of the wireless device 10, and/or based on the type of use of the wireless device 10 is desired.

Next the process 500 may proceed to box 506 where the wireless device 10 may connect to the new wireless network 102 based on the modification settings loaded by the wireless device 10 at box 504.

Thus, a device, system, and method for analyzing cellular connectivity information for a network to which a wireless device receives wireless service across multiple networks has been disclosed. The disclosed subject matter may allow wireless providers to troubleshoot technical issues, modify network settings for wireless device users, and the like based on a variety of data associated with the use of wireless devices on multiple networks. The optimization of wireless services across multiple wireless networks and carriers may improve the experience of users of wireless service plans that allow wireless service across multiple networks.

Further in accordance with various aspects of the disclosure, the methods described herein are intended for operation with dedicated hardware implementations including, but not limited to processors, microprocessors, wireless device chipsets, PCs, PDAs, SIM cards, semiconductors, application specific integrated circuits (ASIC), programmable logic arrays, cloud computing devices, and other hardware devices constructed to implement the methods described herein.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

The wireless networks 102 may include a Mobility Management Entity (MME). The MME may function as a key control-node. The MME may be responsible for idle mode of the wireless device 10 as well as paging and tagging procedures including retransmissions. The MME may be involved in the bearer activation/deactivation process and may also responsible for choosing a Signaling Gateway (SGW) for the wireless device 10 at the initial attach and at a time of intra-LTE handover involving Core Network (CN) node relocation. The MME may be responsible for authenticating the wireless device 10 by interacting with a home subscriber server (HSS) and/or Unified Data Management (UDM). Non Access Stratum (NAS) signaling may terminate at the MME and may also be responsible for generation and allocation of temporary identities to the wireless device 10. The MME may check the authorization of the wireless device 10 to camp on the service provider's Public Land Mobile Network (PLMN) and may enforce roaming restrictions on the wireless device 10. The MME may be a termination point in the wireless network 102 for ciphering/integrity protection for NAS signaling and may handle the security key management. The MME may also provide a control plane function for mobility between LTE and 2G/3G access networks with an S3 interface terminating at the MME from the Serving GPRS Support Node (SGSN). The MME may also terminate an S6a interface towards the home HSS for a roaming wireless device 10.

The SGW may be implemented as a network component responsible for transferring signaling messages (i.e. information related to call establishment, billing, location, short messages, address conversion, and other services) between Common Channel Signaling (CCS) nodes that communicate using different protocols and transports.

Each of the plurality of wireless networks 102 may include a public data network (PDN) gateway (PDN GW). The PDN GW may contain devices such as protocol translators, impedance matching devices, rate converters, fault isolators, or signal translators as necessary to provide system interoperability. The PDN GW may also require the establishment of mutually acceptable administrative procedures between networks.

The PDN may be a circuit-switched or packet-switched network that can transmit data in digital form. The PDN may provide any of X.25, frame relay, cell relay (ATM), or the like services. Access to a PDN generally includes a guaranteed bandwidth, known as the committed information rate (CIR).

The wireless network 102 may include an S5/S8 interface that may be used within the Evolved Packet Core (EPC) for LTE. The S5 interface may provide user plane tunneling and tunnel management between a serving GW and PDN GW. It may be used for Serving GW relocation due to the wireless device 10 mobility and if the serving GW needs to connect to a non-collocated PDN GW for the required PDN connectivity.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may include, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

The disclosure may include communication channels 220 that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, Long Term Evolution (LTE), EVolution-Data Optimized (EVDO), 4G, 5G, and/or the like, and/or a combination of two or more thereof.

The application 22 described in the disclosure may be implemented to execute on an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. The application may be displayed as an icon. The application may have been downloaded from the Internet, pre-installed, or the like. In some aspects, the application may be obtained from Google Play™, Android Market™, Apple Store™, or the like digital distribution source. The application may be written in conjunction with the software developers kit (SDK) associated with an Apple™ iOS' operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system, or the like.

The disclosure may be implemented in any type of computing devices or processor, such as, e.g., a microprocessor, wireless device chipset, a desktop computer, personal computer, a laptop/mobile computer, a personal data assistant (PDA), a mobile phone, a tablet computer, cloud computing device, and the like, with wired/wireless communications capabilities via the communication channels 220.

In an aspect, the disclosure may be implemented in any type of mobile smartphones that are operated by any type of advanced mobile data processing and communication operating system, such as, e.g., an Apple™ iOSM operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

The term text, text message, or SMS refers to "short message service" which is a text messaging service component of phone, web, or mobile communication systems. It uses standardized communications protocols to allow fixed line or mobile phone devices to exchange short text messages. SMS was originally designed as part of GSM, but is now available on a wide range of networks, including 3G, 4G, LTE, 5G, and the like networks or networks associated with the communication channel as defined herein. In other aspects, text message may include Multimedia Messaging Service (MMS), which is a standard way to send messages that include multimedia content to and from mobile phones. It extends the core SMS (Short Message Service) capability that allowed exchange of text messages only up to 160 characters in length. While the most popular use is to send photographs from camera-equipped handsets, it is also used as a method of delivering news and entertainment content including videos, pictures, text pages, and ringtones. MMS can be used within the context of the disclosure for UICC activation message delivery. Of note is that MMS messages are delivered in a completely different way from SMS. The first step is for the sending device to encode the multimedia content in a fashion similar to sending a MIME e-mail (MIME content formats are defined in the MMS Message Encapsulation specification). The message is then forwarded to the carrier's MMS store and forward server, known as the MMSC (Multimedia Messaging Service Centre). If the receiver is on another carrier, the relay forwards the message to the recipient's carrier using the Internet.

The term talk, voice, or voice calls as utilized herein may include voice calls defined by 3GPP (3rd Generation Partnership Project) with Voice Call Continuity (VCC) specifications in order to describe how a voice call can be persisted, as a mobile phone moves between circuit switched and packet switched radio domains (3GPP TS 23.206).

The term data as utilized herein includes mobile broadband or wireless Internet access delivered through mobile phone towers over a communication channel as defined herein to computers, mobile phones, wireless devices, and other digital devices as defined herein using portable modems. Some mobile services allow more than one device to be connected to the Internet using a single cellular connection using a process called tethering.

Aspects of the disclosure include an Application Programming Interface (API). The API may include a set of subroutine definitions, protocols, and tools for building software. The set may include a set of defined methods of communication between the various components of the disclosure. The API may be implemented as a web-based system, an operating system, a database system, a computer hardware, a software library, or the like. The API may include an API specification that may include specifications for routines, data structures, object classes, variables, remote calls, and/or the like. The API may be associated with or related to a software library. The API may describe and prescribe the expected behavior as a set of rules and the software library may be an implementation of this set of rules. In one aspect, the API may be a remote API configured to manipulate remote resources through protocols, specific standards for communication, or the like that allow different technologies to work together, regardless of language or platform. In one aspect, the API may be POSIX, Windows API. In one aspect, the API may be ASPI. In one aspect, the API may be Java API. In one aspect, the API may be Java Database Connectivity API.

While the device, system, and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A system configured to analyze cellular connectivity information for at least one wireless network and at least one user equipment (UE), the system comprising a processor configured to:
   receive cellular connectivity information from at least one wireless network for each of a plurality of UEs, wherein the at least one wireless network (i) comprises a cloud-native configuration and (ii) implements a fifth-generation (5G) cellular standard;
   receive geographic location information from the at least one wireless network respectively for each of the UEs;
   analyze each of the cellular connectivity information, the respective geographic location information, and respective equipment type information (i) related to each of the UEs and (ii) stored in a database;
   generate selection information to select, from among all of the UEs, at least one of the UEs having poor wireless service performance based on the analysis; and
   at least one of the following: output, to a man machine interface, the cellular connectivity information, the geographic location information, and the equipment type information related to the at least one UE; or modify wireless network settings for the at least one selected UE.

2. The system of claim 1 wherein the poor wireless service performance is caused by a wireless equipment type or by the at least one wireless network based on the analysis of the respective cellular connectivity information.

3. The system of claim 1, wherein all of the cellular connectivity information is received by the processor from the at least one wireless network implementing Unified Data Management (UDM).

4. The system of claim 1, wherein all of the geographic location information is received by the processor from the at least one wireless network implementing Unified Data Management (UDM).

5. The system of claim 1, wherein the geographic location information comprises at least one of the following: a current cell tower identification (ID) that the respective UE connects, a Location Area Code (LAC) for the respective UE, and a location determined by a global navigation satellite system (GNSS) with a location determination device implemented by the respective UE.

6. The system of claim 1, wherein the cellular connectivity information comprises at least one of the following: whether the respective UE is registered to a Radio Access Network, a current cell tower identification (ID) that the respective UE connects, a Location Area Code (LAC) for the respective UE, a signal strength (dB) for the respective UE and/or the at least one wireless network, a Signal-to-Noise Ratio (SNR) for the respective UE and/or the at least one wireless network, an LTE RSSI (Received Signal Strength Indicator) for the respective UE and/or the at least one wireless network, an LTE RSRQ (Reference Signal Received Quality) for the respective UE and/or the at least one wireless network, an LTE SINR (Signal to Interference & Noise Ratio) for the respective UE and/or the at least one wireless network, an LTE CQI (Channel Quality Indicator) for the respective UE and/or the at least one wireless network, a RSRP (Reference Signal Received Power) for the respective UE and/or the at least one wireless network, a data latency for the respective UE and/or the at least one wireless network, jitter for the respective UE and/or the at least one wireless network, and a data throughput for the respective UE and/or the at least one wireless network.

7. The system of claim 1, wherein the processor is configured to send a command to perform the modification of the wireless network settings; and
 wherein the command comprises an over the air command to the at least one UE.

8. The system of claim 7, wherein the over the air command includes new network settings.

9. The system of claim 7, wherein the at least one UE includes a wireless transceiver configured to receive the sent command; and
 wherein the at least one UE performs the modification in response to the command received from the processor.

10. A process configured to analyze cellular connectivity information for at least one wireless network and at least one UE, the process comprising:
 receiving cellular connectivity information from at least one wireless network for each of a plurality of UEs with a processor, wherein the at least one wireless network (i) comprises a cloud-native configuration and (ii) implements a fifth-generation (5G) cellular standard;
 receiving geographic location information from the at least one wireless network respectively for each of the UEs with the processor;
 analyzing each of the cellular connectivity information, the respective geographic location information, and respective equipment type information (i) related to each of the UEs wireless devices and (ii) stored in a database, with the processor;
 generating selection information to select, from among all of the UEs, at least one of the UEs having poor wireless service performance with the processor based on the analysis; and
 implementing with the processor at least one of the following: outputting, to a man machine interface, the cellular connectivity information, the geographic location information, and the equipment type information related to the at least one UE with the processor; or modifying wireless network settings for the at least one selected UE.

11. The process of claim 10 wherein the poor wireless service performance is caused by a wireless equipment type or by the at least one wireless network based on the analysis of the respective cellular connectivity information.

12. The process of claim 10, wherein all of the cellular connectivity information is received by the processor from the at least one wireless network implementing Unified Data Management (UDM).

13. The process of claim 10, wherein all of the geographic location information is received by the processor from the at least one wireless network implementing Unified Data Management (UDM).

14. The process of claim 10, wherein the geographic location information comprises at least one of the following: a current cell tower identification (ID) that the respective UE connects, a Location Area Code (LAC) for the respective UE, and a location determined by a global navigation satellite system (GNSS) with a location determination device implemented by the respective UE.

15. The process of claim 10, wherein the cellular connectivity information comprises at least one of the following: whether the respective UE is registered to a Radio Access Network, a current cell tower identification (ID) that the at least one UE connects, a Location Area Code (LAC) for the respective UE, a signal strength (dB) for the respective UE and/or the at least one wireless network, a Signal-to-Noise Ratio (SNR) for the respective UE and/or the at least one wireless network, an LTE RSSI (Received Signal Strength Indicator) for the respective UE and/or the at least one wireless network, an LTE RSRQ (Reference Signal Received Quality) for the respective UE and/or the at least one wireless network, an LTE SINR (Signal to Interference & Noise Ratio) for the respective UE and/or the at least one wireless network, an LTE CQI (Channel Quality Indicator) for the respective UE and/or the at least one wireless network, a RSRP (Reference Signal Received Power) for the respective UE and/or the at least one wireless network, a data latency for the respective UE and/or the at least one wireless network, jitter for the respective UE and/or the at least one wireless network, and a data throughput for the respective UE and/or the at least one wireless network.

16. The process of claim 10, further comprising:
 sending a command to perform the modification of the wireless network settings,
 wherein the command comprises an over the air command to the at least one UE.

17. The process of claim 16, wherein the over the air command includes new network settings.

18. The process of claim 16, wherein the at least one UE includes a wireless transceiver configured to receive the sent command; and
 wherein the at least one UE performs the modification in response to the command received from the processor.

* * * * *